(12) United States Patent
Nomura

(10) Patent No.: US 10,668,681 B2
(45) Date of Patent: Jun. 2, 2020

(54) CUTTING DEVICE FOR STEEL WIRE FOR BEAD CORE

(71) Applicants: FUJI SEIKO CO., LTD., Hashima-shi, Gifu-ken (JP); FUJI SHOJI CO., LTD., Hashima-shi, Gifu-ken (JP)

(72) Inventor: Shigeaki Nomura, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 249 days.

(21) Appl. No.: 15/505,415

(22) PCT Filed: Aug. 27, 2014

(86) PCT No.: PCT/JP2014/072427
§ 371 (c)(1),
(2) Date: Feb. 21, 2017

(87) PCT Pub. No.: WO2016/030991
PCT Pub. Date: Mar. 3, 2016

(65) Prior Publication Data
US 2017/0266902 A1 Sep. 21, 2017

(51) Int. Cl.
*B29D 30/48* (2006.01)
*B21F 11/00* (2006.01)

(52) U.S. Cl.
CPC .............. *B29D 30/48* (2013.01); *B21F 11/00* (2013.01); *B29D 2030/485* (2013.01); *B29D 2030/487* (2013.01)

(58) Field of Classification Search
CPC .... B29D 30/48; B26D 1/04; B26D 2030/485; B26D 2030/487; B21F 11/00
See application file for complete search history.

(56) References Cited

U.S. PATENT DOCUMENTS 3,334,533 A * 8/1967 Davis, Jr. ................. D01G 1/04
19/0.6
4,597,157 A * 7/1986 Ichikawa ............... B29D 30/48
140/88
(Continued)

FOREIGN PATENT DOCUMENTS

CN          1161926 A    10/1997
JP       2006-289733 A    10/2006
(Continued)

OTHER PUBLICATIONS

International Preliminary Report on Patent Ability for Application No. PCT/JP2014/072427 dated Feb. 28, 2017.
(Continued)

*Primary Examiner* — Omar Flores Sanchez
(74) *Attorney, Agent, or Firm* — Tarolli, Sundheim, Covell & Tummino LLP

(57) ABSTRACT

A cutting device for bead core steel wire includes a first holder that holds a first blade body, a second holder that holds a second blade body, and a driver that moves one of the first holder and the second holder relative to the other of the first holder and the second holder. At least one of the first blade body and the second blade body is rod-shaped and includes a plurality of cutting edges arranged on a periphery of the at least one of the first blade body and the second blade body.

2 Claims, 5 Drawing Sheets

(56) References Cited

U.S. PATENT DOCUMENTS

| | | | | |
|---|---|---|---|---|
| 5,113,733 A * | 5/1992 | Peterson | ............. | B23D 15/002 |
| | | | | 83/169 |
| 5,195,415 A * | 3/1993 | Buck | .................... | B23D 15/10 |
| | | | | 83/162 |
| 2007/0232027 A1 | 10/2007 | Kumamoto | | |
| 2009/0004827 A1 | 1/2009 | Kumamoto | | |
| 2011/0030835 A1 * | 2/2011 | Morisaki | ................ | B21F 37/00 |
| | | | | 140/88 |

FOREIGN PATENT DOCUMENTS

| | | | |
|---|---|---|---|
| JP | 2007-273729 A | 10/2007 |
| JP | 2010089172 A | 4/2010 |
| JP | 2011-79133 A | 4/2011 |
| JP | 2013249680 A | 12/2013 |

OTHER PUBLICATIONS

International Search Report for Application No. PCT/JP2014/072427 dated Oct. 21, 2014.
Chinese Office Action corresponding to Chinese Patent Application No. 201480081392.7 dated Jul. 3, 2018.
Japanese Office Action corresponding to Japanese Patent Application No. 2016-545142 dated May 29, 2018.

* cited by examiner

CUTTING DEVICE FOR STEEL WIRE FOR BEAD CORE

RELATED APPLICATIONS

The present invention is a U.S. National Stage under 35 USC 371 patent application, claiming priority to Serial No. PCT/JP2014/072427, filed on 27 Aug. 2014; the entirety of which is incorporated herein by reference.

TECHNICAL FIELD

The present invention relates to a cutting device for bead core steel wire.

BACKGROUND ART

A cutting device known in the art includes a blade body that has a sharp cutting edge and cuts a steel wire for a bead core. Patent document 1 describes a cutting device that cuts a steel wire placed on a board by pressing the sharp cutting edge against the steel wire.

PRIOR ART DOCUMENT

Patent Document
Patent Document 1: Japanese Laid-Open Patent Publication No. 2006-289733

SUMMARY OF THE INVENTION

Problems that are to be Solved by the Invention

In the cutting device of patent document 1, when the blade body performs repetitive cutting, the cutting edge becomes dull. Thus, a new blade body always needs to be prepared for replacement.

It is an object of the present invention to provide a cutting device for bead core steel wire that extends the life of a blade body.

Means for Solving the Problems

To achieve the above object, the present invention provides a cutting device for bead core steel wire including a first holder that holds a first blade body, a second holder that holds a second blade body, and a driver that moves one of the first holder and the second holder relative to the other one of the first holder and the second holder. At least one of the first blade body and the second blade body is rod-shaped and includes a plurality of cutting edges arranged on a periphery of the at least one of the first blade body and the second blade body.

In this structure, when one of the cutting edges of the blade body becomes dull, another one of the cutting edges may be used to cut a steel wire. This extends the life of the blade body.

Effect of the Invention

The cutting device for bead core steel wire according to the present invention succeeds in extending the life of the blade body.

MODES FOR CARRYING OUT THE INVENTION

A cutting device for bead core steel wire according to one embodiment will now be described.

Figure 1:
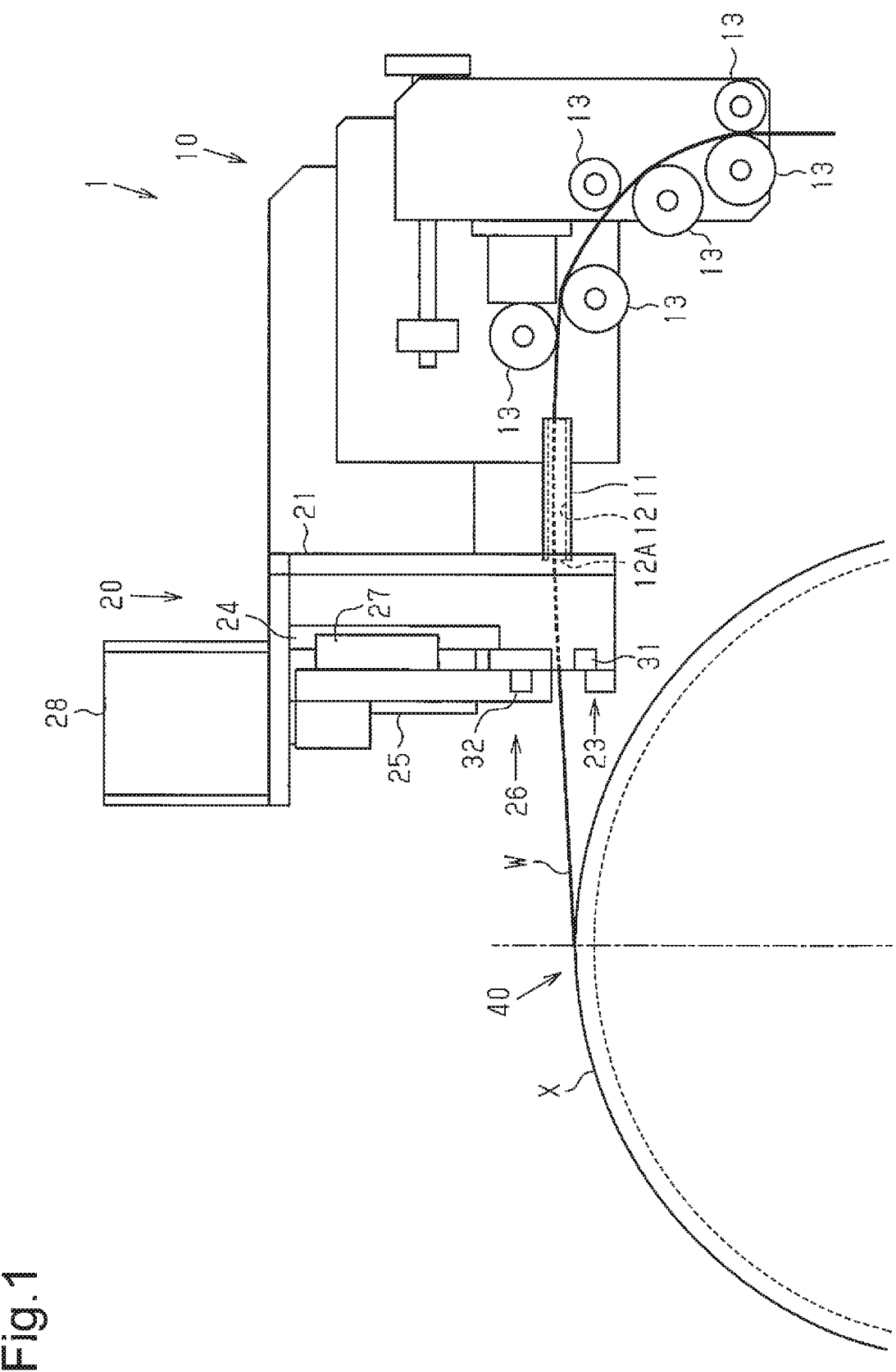
FIG. 1 is a front view showing a bead core formation apparatus according to one embodiment.

As shown in FIG. 1, a bead core formation apparatus 1, which forms a bead core X from a rubber-coated steel wire W, includes a former 40, which forms the bead core X by winding the steel wire W around the circumference of the former 40, a guide device 10, which guides the steel wire W to the former 40, and a cutting device 20.

Figure 2:
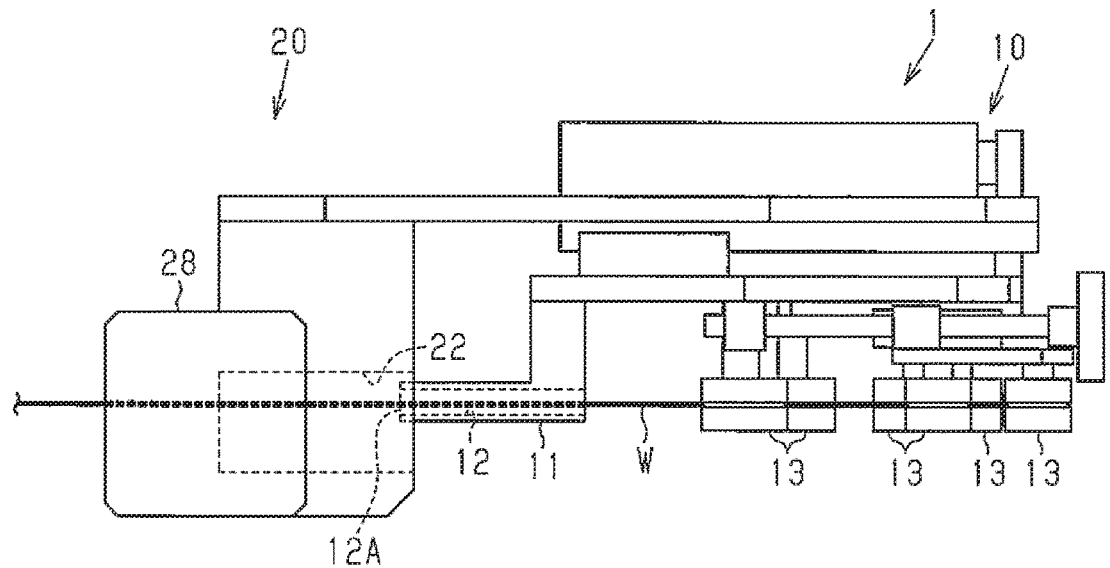
FIG. 2 is a plan view showing the bead core formation apparatus of the embodiment.

As shown in FIG. 2, the guide device 10 includes a guide member 11, in which a guide slot 12 is formed to receive the steel wire W, and rollers 13, which feed the steel wire W to the guide member 11. The guide slot 12 extends straight.

Figure 3:
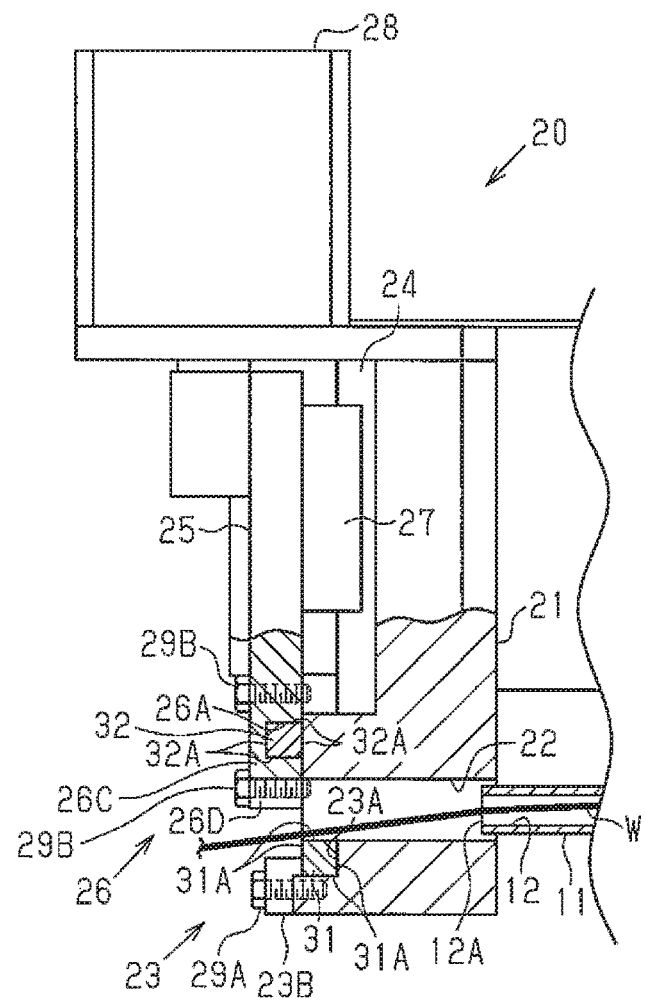
FIG. 3 is a partial cross-sectional view showing a cutting device of the embodiment.

As shown in FIG. 1, the cutting device 20 is located between the guide device 10 and the former 40. When the formation of the bead core X is completed, the cutting device 20 cuts the steel wire W. As shown in FIG. 3, the cutting device 20 includes a column 21, which includes a rail 24, a movable portion 25, which is movably coupled to the rail 24 by a slider 27, and an air cylinder 28, which functions as a driver that moves the movable portion 25. The air cylinder 28 moves the movable portion 25 in a direction orthogonal to a longitudinal direction of a first blade body 31 and a second blade body 32, which will be described later.

Figure 4:
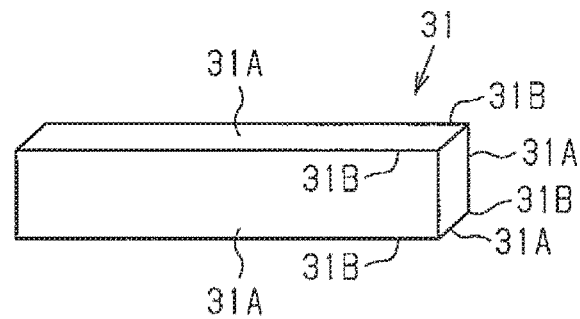
FIG. 4 is a perspective view showing a first blade body attached to the cutting device of the embodiment.
Figure 5:
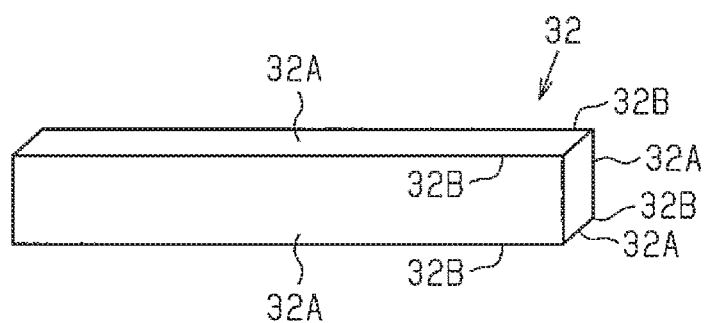
FIG. 5 is a perspective view showing a second blade body attached to the cutting device of the embodiment.

The first blade body 31 is attached to the column 21 of the cutting device 20. The second blade body 32 is attached to the movable portion 25. As shown in FIG. 4, the first blade body 31, which is rod-shaped, includes side surfaces 31A and cutting edges 31B, each of which is located between adjacent ones of the side surfaces 31A. Preferably, the first blade body 31 is a square rod. As shown in FIG. 5, the second blade body 32, which is rod-shaped, includes side surfaces 32A and cutting edges 32B, each of which is located between adjacent ones of the side surfaces 32A. Preferably, the second blade body 32 is a square rod. The dimension of the second blade body 32 in the longitudinal direction is greater than the dimension of the first blade body 31 in the longitudinal direction.

As shown in FIG. 3, the column 21 includes a slot 22, into which the steel wire W is drawn. The guide slot 12 of the guide member 11 includes an outlet port 12A, which is inserted into the slot 22. Thus, when the steel wire W passes through the guide slot 12, the steel wire W is guided into the slot 22. The column 21 includes a first holder 23, which holds the first blade body 31. The first holder 23 is defined by the end of a lower wall of the slot 22 that is located close to the former 40 (refer to FIG. 1).

Figure 6:
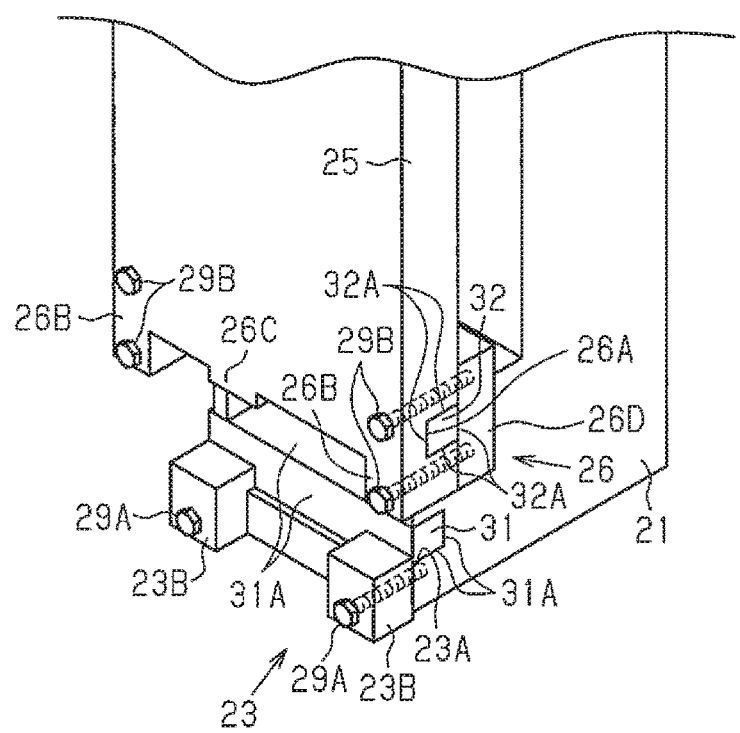
FIG. 6 is a perspective view showing the cutting device of the embodiment.

The first holder 23 includes a groove 23A, which is formed in the lower wall of the slot 22, and two brackets 23B. As shown in FIG. 6, the two brackets 23B are arranged at opposite longitudinal ends of the blade body 31. As shown in FIG. 3, the first blade body 31 is fitted into the groove 23A so that one of the side surfaces 31A that is faced downward and one of the side surfaces 31A that is faced toward the guide device 10 are in contact with walls defining the groove 23A. One of the side surfaces 31A that is faced toward the former 40 (refer to FIG. 1) includes a lower portion, which is in contact with the two brackets 23B.

The two brackets 23B and the walls of the groove 23A hold the first blade body 31 in between at the opposite longitudinal ends of the first blade body 31. Each of the brackets 23B is coupled to the column 21 by a bolt 29A, which is fastened to the bracket 23B and the column 21 from a position located closer to the former 40 (refer to FIG. 1) than the bracket 23B.

Figure 7:
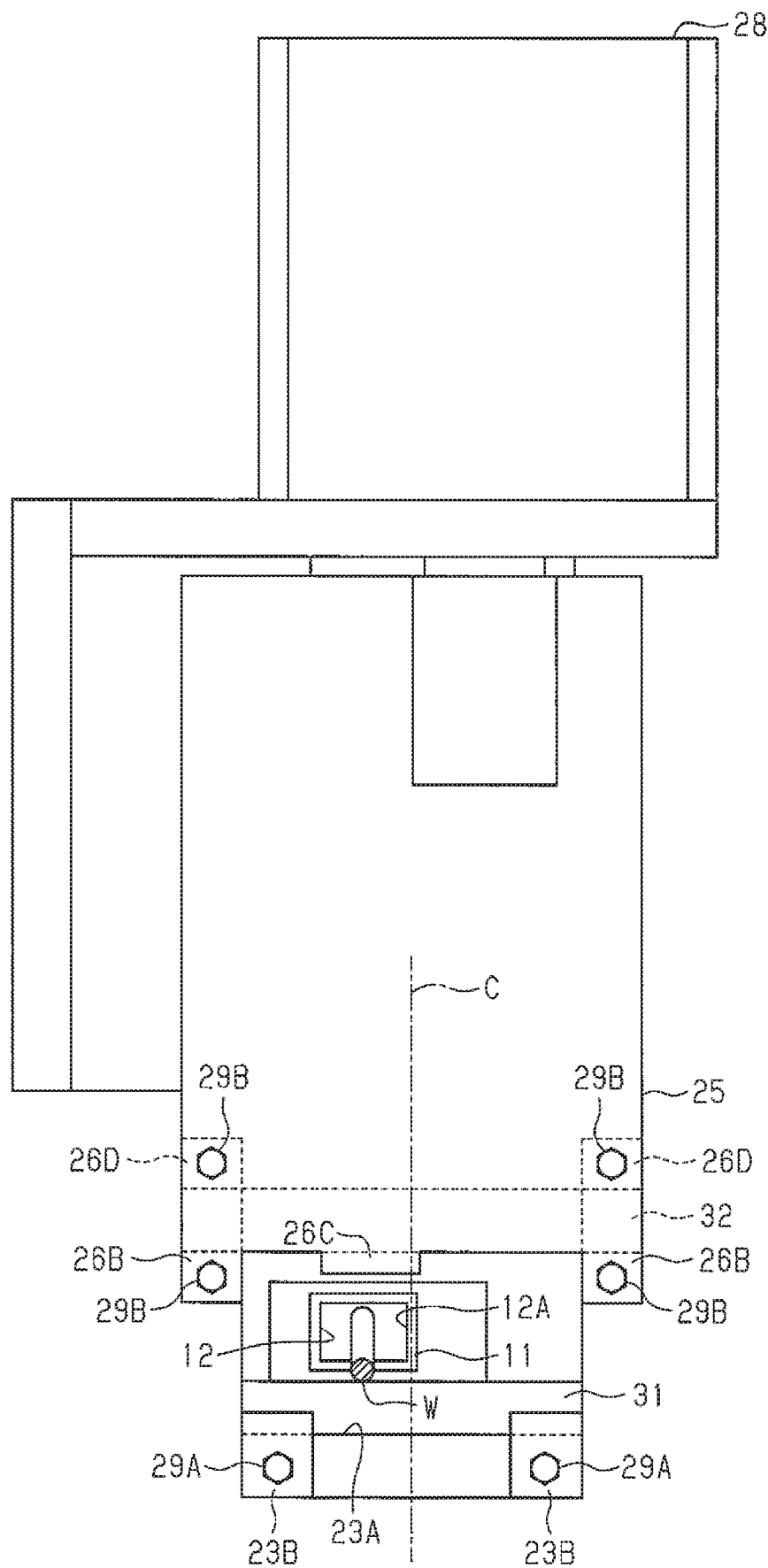
FIG. 7 is a front view showing the cutting device of the embodiment.

As shown in FIGS. 6 and 7, the movable portion 25 has a lower end that includes a second holder 26, which holds the second blade body 32.

The second holder 26 includes a groove 26A, which is formed in a surface of the movable portion 25 located close to the column 21, two projections 26B, a support portion 26C, and two brackets 26D.

The two projections 26B are located at opposite lower ends of the movable portion 25. The two projections 26B project downwardly from the movable portion 25 and then toward the column 21. The two projections 26B support the second blade body 32 from below at opposite longitudinal ends of the second blade body 32.

The support portion 26C is located between the two projections 26B. As shown in FIG. 3, the support portion 26C projects downwardly from the movable portion 25 and then toward the column 21. The support portion 26C supports the second blade body 32 from below at an intermediate portion of the second blade body 32 in the longitudinal direction.

As shown in FIGS. 6 and 7, at the lower end of the movable portion 25, the two brackets 26D are located closer to the column 21 than the second blade body 32 at the opposite longitudinal ends of the second blade body 32. Each of the two brackets 26D is coupled to the corresponding one of the projections 26B by two bolts 29B. One of the two bolts 29B is fastened to the bracket 26D and the movable portion 25 above the second blade body 32 from a position closer to the former 40 (refer to FIG. 1) than the bracket 26D. The other one of the two bolts 29B is fastened to the bracket 26D and the movable portion 25 below the second blade body 32 from a position closer to the former 40 (refer to FIG. 1) than the bracket 26D.

The second blade body 32 is fitted into the groove 26A so that one of the side surfaces 32A that is faced upward and one of the side surfaces 32A that is faced toward the former 40 (refer to FIG. 1) are in contact with walls defining the groove 26A. One of the side surfaces 32A that is faced toward the column 21 is in contact with the two brackets 26D. One of the side surfaces 32A that is faced downward is in contact with the two projections 26B and the support portion 26C. The two projections 26B and the two brackets 26D hold the second blade body 32 in between at the opposite longitudinal ends of the second blade body 32.

As shown in FIG. 7, the two projections 26B are located outside the longitudinal ends of the first blade body 31. Thus, the first holder 23 and the second holder 26 hold the first blade body 31 and the second blade body 32 so that in the longitudinal direction of the first blade body 31 and the second blade body 32, the opposite ends of the first blade body 31 are located inward from the opposite ends of the second blade body 32. Preferably, the first blade body 31 and the second blade body 32 have the same center C in the longitudinal direction. The steel wire W is guided by the guide member 11 to a cutting position, which is separated from the center C of the first blade body 31 and the second blade body 32 in the longitudinal direction.

Figure 8:
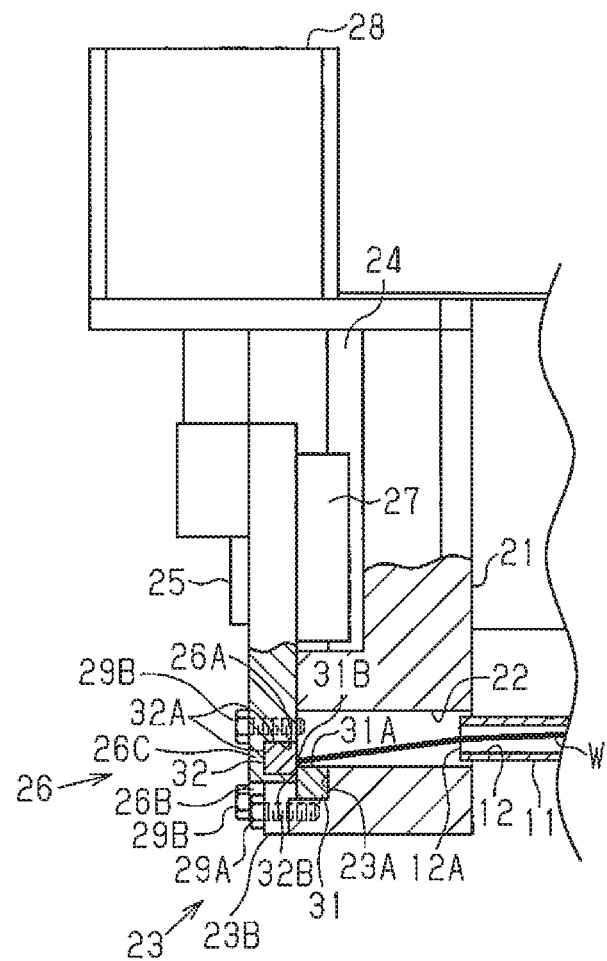
FIG. 8 is a front view of the cutting device when a movable portion shown in FIG. 3 is downwardly moved.

As shown in FIG. 8, when the air cylinder 28 is driven, the air cylinder 28 transmits force to move the slider 27 of the movable portion 25 on the rail 24 relative to the column 21. This moves the second holder 26 and the second blade body 32 toward the first holder 23 and the first blade body 31.

The steel wire W, which is placed between the first blade body 31 and the second blade body 32, is held between and cut by one of the cutting edges 31B of the first blade body 31 and one of the cutting edges 32B of the second blade body 32 at the cutting position.

The operation of the cutting device 20 will now be described.

When the cutting edges 31B, 32B of the blade bodies 31, 32 become dull, the operator removes the blade bodies 31, 32 from the holders 23, 26 to rotate the blade bodies 31, 32 about the longitudinal axis by 90 degrees or 180 degrees and again attaches the blade bodies 31, 32 to the holders 23, 26. This allows the steel wire W to be cut by the cutting edges 31B, 32B that differ from those used prior to the removal. Since the blade bodies 31, 32 respectively include four cutting edges 31B, 32B, the same blade bodies 31, 32 may be continuously used until the four blades 31B, 32B become dull.

The steel wire W is guided by the guide member 11 to the cutting position, which is separated from the center C of the first blade body 31 and the second blade body 32 in the longitudinal direction. Thus, the first blade body 31 and the second blade body 32 cut the steel wire W at the cutting position, which is separated from the center C in the longitudinal direction. Hence, when the cutting edges 31B, 32B of the blade bodies 31, 32 become dull, the operator removes the blade bodies 31, 32 from the holders 23, 26 and rotates the blade bodies 31, 32 to reverse the left and right sides. Then, the operator attaches the blade bodies 31, 32 again to the holders 23, 26. In this case, portions of the same cutting edges 31B, 32B that differ from those used prior to the removal may be used for subsequent cutting of the steel wire W. Thus, the same blade bodies 31, 32 may be continuously used until two portions of each of the four cutting edges 31B, 32B, that is, eight portions in total, become dull.

The embodiment has the advantages described below.

(1) The cutting device 20 cuts the steel wire W sequentially using the multiple cutting edges 31B, 32B of the blade bodies 31, 32. Thus, the life of the blade bodies 31, 32 is extended. This decreases the frequency for replacing the blade bodies 31, 32 with new blade bodies 31, 32.

(2) The cutting device 20 allows the portions of the cutting edges 31B, 32B that cut the steel wire W to be changed by reversing the left and right sides of the blade bodies 31, 32. This further decreases the frequency for replacing the blade bodies 31, 32 with new blade bodies 31, 32.

(3) The first holder 23 and the second holder 26 hold the first blade body 31 and the second blade body 32 so that in the longitudinal direction of the first blade body 31 and the second blade body 32, the opposite ends of the first blade body 31 are located inward from the opposite ends of the second blade body 32. Thus, when the steel wire W is cut by the first blade body 31 and the second blade body 32, the opposite ends of the second blade body 32 do not interfere with the first blade body 31. This allows the projections 26B to be formed at the opposite ends of the second blade body 32 and support the second blade body 32 from below by the projections 26B. Thus, the second blade body 32 is stably held.

(4) When a blade body is not a regular polygonal rod, that is, when a blade body has side surfaces and cutting edges that do not conform to one another in size, if the holder is shaped in conformance with a particular one of the cutting edges, a gap will be formed between the holder and the blade body when the remaining cutting edges are used. This needs, for example, a spacer between the holder and the blade body.

In this regard, the blade bodies 31, 32 are each a square rod, which is a regular polygonal rod. This limits formation of a gap between the corresponding ones of the holders 23, 26 and the blade bodies 31, 32 regardless of which one of the cutting edges 31B, 32B of the blade bodies 31, 32 is used. Thus, increases in the number of components are limited as compared to a structure that uses a spacer or the like.

The embodiment may be modified as follows.

One of the first blade body 31 and the second blade body 32 may be plate-shaped and include only one sharp cutting edge when the other one is tetragonally rod-shaped and includes a plurality of the cutting edges 31B, 32B. This case also extends the life of the tetragonally rod-shaped one of the first blade body 31 and the second blade body 32.

The outlet port 12A of the guide member 11 may be movable in the longitudinal direction of the first blade body 31 and the second blade body 32. In this case, the cutting position of each of the cutting edges 31B, 32B may be changed without switching the cutting edges 31B, 32B that are used for cutting. Thus, when the cutting edges 31B, 32B used for cutting are switched, the same blade bodies 31, 32 may be continuously used until eight or more portions of each of the blade bodies 31, 32 become dull.

The holders 23, 26 may be configured to hold the blade bodies 31, 32 at different positions in the longitudinal direction of the blade bodies 31, 32. For example, the holders 23, 26 respectively include the grooves 23A, 26A that extend longer than the length of the blade bodies 31, 32 in the longitudinal direction of the blade bodies 31, 32. This allows the blade bodies 31, 32 to be held in the respective grooves 23A, 26A at different positions in the longitudinal direction. Even in this case, the cutting position of each of the cutting edges 31B, 32B can be changed without switching the cutting edges 31B, 32B that are used for cutting.

The steel wire W may be guided to the center C by directing the outlet 12A of the guide member 11 to the center C in the longitudinal direction of the first blade body 31 and the second blade body 32. In this case, the same blade bodies 31, 32 may be continuously used until four portions of each of the blade bodies 31, 32 become dull by switching the cutting edges 31B, 32B that are used for cutting.

The first blade body 31 and the second blade body 32 may have the same length. In this case, the two brackets 23B and the two projections 26B are located at different positions so that the first holder 23 will not interfere with the second holder 26 when the steel wire W is cut.

Figure 9:
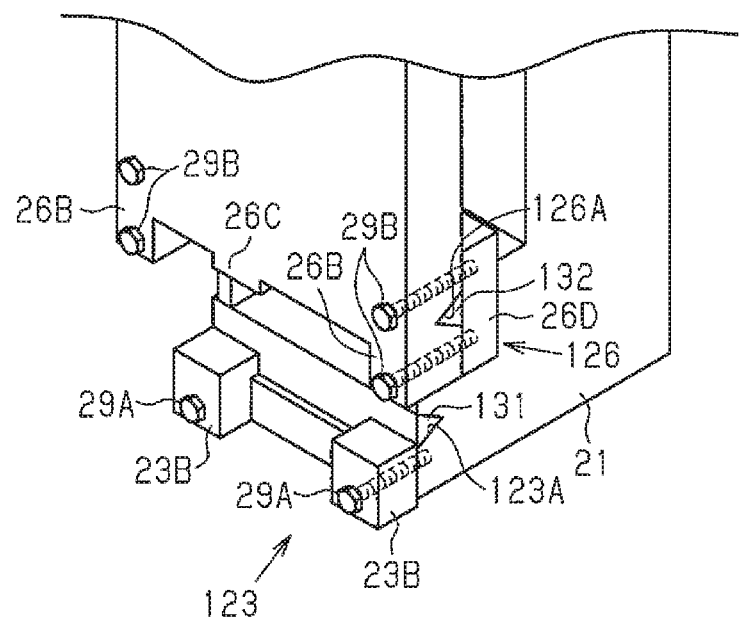
FIG. 9 is a perspective view showing a cutting device according to a modification.

As shown in FIG. 9, holders 123, 126 that hold blade bodies 131, 132, each of which is formed by a true triangular rod, may be arranged instead of the first holder 23 and the second holder 26. The holders 123, 126 respectively include grooves 123A, 126A that are shaped in conformance with a true triangular rod. Alternatively, when one of the first blade body 131 and the second blade body 132 is a true triangular rod, the other may be a square rod.

Each side surface of the blade bodies 31, 32 may be recessed more at a position farther from the corresponding one of the cutting edges 31B, 32B. This sharpens the cutting edges 31B, 32B and facilitates the cutting of the steel wire W.

The movable portion 25 may be moved parallel to one of the side surfaces 31A of the blade body 31 located close to the former 40 in a direction inclined from a direction orthogonal to the longitudinal direction of the blade bodies 31, 32. In other words, the cutting device 20 may be configured to cut the steel wire W by moving the second blade body 32 from an upper left side to a lower right side (or from upper right side to lower left side) in FIG. 7.

The air cylinder 28 may be replaced by a motor.

DESCRIPTION OF REFERENCE CHARACTERS

20 . . . cutting device, 23 . . . first holder, 26 . . . second holder, 28 . . . air cylinder (driver), 31 . . . first blade body, 31B . . . cutting edge, 32 . . . second blade body, 32B . . . cutting edge

The invention claimed is:

1. A cutting device for bead core steel wire comprising:
a first holder that holds a first blade body;
a second holder that holds a second blade body; and
a driver that moves one of the first holder and the second holder relative to the other of the first holder and the second holder,
wherein at least one of the first blade body and the second blade body is rod-shaped and includes a plurality of cutting edges arranged on a periphery of the at least one of the first blade body and the second blade body,
wherein the plurality of cutting edges extend in a longitudinal direction of the at least one of the first blade body and the second blade body,
wherein the steel wire is guided to a cutting position that is separated from a center of the at least one of the first blade body and the second blade body in the longitudinal direction of the at least one of the first blade body and the second blade body,
wherein the second blade body is longer than the first blade body, and
wherein the first holder and the second holder hold the first blade body and the second blade body so that in a longitudinal direction of the first blade body and the second blade body, opposite ends of the first blade body are located inward from opposite ends of the second blade body.

2. The cutting device for bead core steel wire according to claim 1, wherein the rod-shaped includes a square rod.

* * * * *